(12) United States Patent
Langenberg et al.

(10) Patent No.: US 7,282,826 B2
(45) Date of Patent: Oct. 16, 2007

(54) DRIVING DEVICE FOR SPROCKET WHEELS OF CHAIN DRIVES

(75) Inventors: Werner Langenberg, Lüdinghausen (DE); Gerhard Merten, Werne (DE); Werner Bohle, Lünen (DE)

(73) Assignee: DBT GmbH, Lunen (DE)

( * ) Notice: Subject to any disclaimer, the term of this patent is extended or adjusted under 35 U.S.C. 154(b) by 610 days.

(21) Appl. No.: 10/930,562

(22) Filed: Aug. 31, 2004

(65) Prior Publication Data

US 2005/0081666 A1    Apr. 21, 2005

(30) Foreign Application Priority Data

Sep. 1, 2003    (DE) ................ 103 40 593

(51) Int. Cl.
  *H02K 7/116*    (2006.01)
  *E21C 27/34*    (2006.01)
(52) U.S. Cl. .............. 310/83; 310/75 R; 299/34.07; 198/832; 74/342
(58) Field of Classification Search .......... 310/75 R, 310/70, 83; 299/34.07; 198/832, 834, 835; 74/342, 370; 474/70
See application file for complete search history.

(56) References Cited

U.S. PATENT DOCUMENTS

| | | | |
|---|---|---|---|
| 1,989,271 A * | 1/1935 | Curtis | ............... 74/343 |
| 3,178,955 A | 4/1965 | Enders et al. | |
| 3,335,622 A * | 8/1967 | Muller et al. | ............ 74/661 |
| 3,555,921 A | 1/1971 | Gotsch et al. | |
| 3,785,443 A * | 1/1974 | Armbruster | ............ 173/48 |
| 4,019,400 A * | 4/1977 | Stump | ............ 74/333 |
| 4,353,263 A | 10/1982 | Ciciora | |
| 4,488,447 A | 12/1984 | Gebhardt | |
| 4,643,037 A * | 2/1987 | Kis | ............ 74/342 |
| 5,513,902 A | 5/1996 | Pago et al. | |
| 5,533,712 A * | 7/1996 | Fujikawa et al. | ........ 254/362 |
| 6,008,605 A | 12/1999 | Weigel et al. | |
| 6,105,450 A * | 8/2000 | Sasaki et al. | ......... 74/421 A |

FOREIGN PATENT DOCUMENTS

| | | | |
|---|---|---|---|
| DE | 3502665 A1 * | 10/1986 | |
| DE | 374 1762 | 5/1989 | |
| DE | 3824372 A1 * | 1/1990 | |
| DE | 402 4830 | 2/1992 | |
| DE | 431 6798 | 12/1994 | |
| DE | 197 35022 | 2/1999 | |
| DE | 19801255 A1 * | 7/1999 | |
| GB | 2 104 166 A | 3/1983 | |

* cited by examiner

*Primary Examiner*—Burton Mullins
(74) *Attorney, Agent, or Firm*—Fay Sharpe LLP

(57) ABSTRACT

A drive system for chain sprockets 1 of chain drives, more particularly for driving chain scraper conveyors or chain-drawn ploughs for underground mining, with a drive assembly formed of an asynchronous motor and a gear mechanism 4, the gear mechanism 4 being designed as overload gearing and having a controllable multiple-disk clutch for overload equalisation with which the force flow between the asynchronous motor and the chain sprocket can be disconnected. The asynchronous motor comprises a frequency converter motor 10 and in the drive assembly between the motor shaft and the gear mechanism 4 a two-gear toothed wheel gear mechanism is arranged as a forward gear mechanism, with a starting gear position and a normal gear position, with which in the starting gear position the breakaway effect required for starting the loaded chain scraper conveyor or for releasing the plough can be attained.

22 Claims, 2 Drawing Sheets

DRIVING DEVICE FOR SPROCKET WHEELS OF CHAIN DRIVES

BACKGROUND

The invention relates to a drive system for chain sprockets of chain drives, preferably for driving chain scraper conveyors or chain-drawn ploughs for underground mining, with a drive assembly formed of an asynchronous motor and a gear mechanism, the gear mechanism being designed as an overload and load equalisation gear unit having a controllable multiple-disk clutch for overload equalisation with which multiple-disk clutch the force flow between the asynchronous motor and the chain sprocket can be disconnected.

A drive system of this type is known from DE 40 24 830 A1 or U.S. Pat. No. 5,551,902 for example. In the known chain drive, unregulated three phase a.c. asynchronous motors are used. With the downstream arranged overload and load compensation gearing, during operation of the drive system load compensation between the main drive and the auxiliary drive of the coal plough or chain scraper conveyor is brought about in order to optimise the operation of the coal plough or chain scraper conveyor and to prevent unfavourable loading conditions for the chain. In the case of the drive system in DE 40 24 830 A1 an auxiliary motor is assigned to the overload and load sharing gearing which can be switched on and off when the asynchronous motor is at a standstill in order to tension the chain. At the same time, in order to tension the chain in the drive connection between the asynchronous motor and the overload and load compensation gear mechanism, a blocking device which blocks the asynchronous motor from turning is provided.

In place of unregulated three phase a.c. asynchronous motors (rotary current asynchronous motors), pole reversing asynchronous motors (DE 37 41 762 A1) and computer-controlled three phase a.c. asynchronous motors (U.S. Pat. No. 6,008,605) have been proposed, in which for each motor the individual torque-revolution characteristic curve is stored in an assigned computer. By means of a revolution counter, when the motors are in operation the current revolutions are permanently determined in a potential-separated manner in order to regulate the motor by way of comparing the current revolutions with the individual revolutions according to the characteristic curve. Due to the proportionality of revolutions and torque, with appropriate rotary current asynchronous electric motors the given torque can be adjusted.

In underground mining, efforts are being made to use three phase a.c. motors with frequency converters, known as frequency converter motors, as electric drives. With frequency converter motors constant adjustment of the revolutions is possible. The rough underground ambient conditions, with dust, moisture and corrosion, as well as the statically determined coupling of the frequency converter motor with the overload gearing cause problems for the use of frequency converter motors which have hitherto prevented the broad possibilities of using frequency converter motors. However, one use of frequency converter motors is known in which a rotary elastic and breakthrough-proof claw coupling is arranged between the overload coupling and the frequency converter motor. The intermediate claw coupling considerably increases the space required for the drives in the underground working faces so that correspondingly assembled drive system can only be used in an underground working face if there is sufficient space available. Furthermore, when using frequency converters on chain drives there are still considerable difficulties in achieving the breakaway effect required for starting a loaded chain scraper conveyor or releasing a plough jammed in the working face.

SUMMARY

The aim of the invention is to create a drive system for chain sprockets of chain drives in which revolution and torque control of the asynchronous motors is possible and in which the required breakaway effect can be exerted on the chain sprocket and thereby the chain.

In accordance with the invention this task is achieved in that the asynchronous motor comprises a frequency converter motor and in the drive assembly a two-gear toothed wheel gear mechanism with a start gear and normal gear is placed between the motor shaft and the gear mechanism. By way of the intermediate two-gear toothed wheel gear mechanism all the advantages of a frequency converter can be exploited in underground drive system and at the same time, through changing from the normal gear to the starting gear position, it is possible to increase the torque for the breakaway effect in an overproportional manner. A further advantage of the toothed wheel gear mechanism with the two gear positions is that chain tensioning systems, as otherwise provided by auxiliary motors or other devices in the state of the art, can be dispensed with.

In a preferred embodiment the toothed wheel gearing is designed as a forward gear mechanism so that it is arranged between the frequency converter motor and the overload gear mechanism. In a particularly preferred embodiment the toothed wheel gear mechanism has a returning transmission gear mechanism with a gear transmission of 1:3 to 1:4 as the starting gear, so that the drive torque delivered in the starting gear is approximately two to four times the nominal torque.

The toothed wheel or forward gear mechanism preferably also has a drive side central wheel borne in a rotating manner on the drive shaft and a output side central wheel borne in a rotating manner on the drive shaft, between which a control gear is connected in a torsion-stable manner to the drive shaft, whereby the control wheel can be coupled by means of a gearing system either to the drive-side or output-side central wheel. In order to simplify controlling the gear mechanism, both central wheels and the control wheel have an aligned and adjacent toothed section with identical toothing. The gear system can then comprise, in particular, a control hub which can be slid over the toothed sections of two adjacent toothed wheels of the forward gear mechanism in order to lock the adjacent wheels together so that they rotate together. In a preferred embodiment the control hub is moved by means of a gear fork, which can be displaced parallel to the gear shaft axis by means of a gear rod. In particular, the toothed wheel gear mechanism can be designed so that operation of the control system and therefore changing the gear position can also take place under load.

The gear shaft may be borne on the gear mechanism casing on the output side and may be supported on the motor drive side by the drive side toothed wheel, which is borne on the gear mechanism casing in a rotating manner. Particularly preferred is a transmission gearing for the start gear position including a secondary shaft borne in a rotating manner on the gear casing, which has a first gear toothing engaging in the drive side central wheel and second gear toothing engaging in the output central wheel. At least the first gear toothing can be part of a single wheel connected in a torsion-stable manner to the secondary shaft in order to facilitate assembly of the toothed wheel gear mechanism and the secondary shaft. The toothed wheel or forward gear mechanism is expediently designed as a spur gear. It is particularly advantageous if the drive-side central wheel is designed as a bushing and/or is provided on the inside with a hub connection for the motor shaft. By way of this embodiment a radial displacement of the motor shaft of the frequency converter motor can be easily intercepted. The frequency converter motor and the toothed wheel gear mechanism can also be arranged in a common casing, whereby the central wheel on the motor drive side is arranged on the motor shaft or is part of the motor shaft, so that an additional bearing can be saved if necessary.

It is desirable to minimise the maximum space required for underground chain drives and to improve a statically determined connection of the frequency converter motor to the toothed wheel gear mechanism. Therefore, in the case of a frequency converter motor which is provided with a stator with stator windings, a rotor and a frequency converter switch, and a motor shaft, the motor shaft is borne in a rotating manner on the motor flange side and rear of the motor casing, and which motor shaft is preferably designed as a hollow shaft, the axial boring of which is penetrated by a torsion rod which is coupled in a moving manner only at the rear end of the hollow shaft.

In a preferred embodiment, in the frequency converter motor according to the invention, the torque rod passes trough the axial boring and/or the motor case in a contact-free manner on the motor flange side, i.e. there is no bearing provided for the torsion rod on the motor flange side and no support on the hollow shaft. By way of this measure, and without an intermediate torsionally elastic coupling, statically determined coupling can be achieved between the motor and the downstream drive system, even when due to manufacturing inaccuracies or assembly imprecision there is no exact alignment of the motor shaft with the input shaft of the downstream drive system. For the drive coupling between the motor and the downstream drive system it is particularly advantageous to be able to push the torsion rod into the hollow shaft from its rear end and through the hollow shaft.

Expediently the motor flange side end of the torsion rod is provided with a pinion gear, toothing or a shaft connection, the external diameter of which is smaller than the minimum internal diameter of the axial boring in order to allow the torsion rod to be passed through from the rear end of the hollow shaft, which is always accessible even when the motor is assembled. The rear end of the torsion rod can expediently be provided with a spur gear, a hub connection or hub connection toothing, the external diameter of which is greater than the motor flange side of the torsion rod and the internal diameter of the axial boring.

As additional safety for the motor used in underground mining, it is recommended to create a breakage point on the rear end of the torsion rod and to arrange fastening means for assembly/dismantling aids for the torsion rod between the breakage point and the motor flange side of the hollow shaft, so that even after a breakage of the torsion rod at the breakage point dismantling of all the parts of the torsion rod can be carried out without the motor having to be loosened on the motor flange side of the downstream drive system. The fastening means can, in particular, include an axial threaded boring in the face side of the torsion rod.

In frequency converter motors it is particularly preferable if the frequency converter control is integrated into the frequency converter motor, more particularly arranged in a control box integrated into the motor casing. In a preferred embodiment the torsion rod projects from the motor casing with its motor flange side end or the motor flange side pinion gear. The motor flange side end of the torsion rod can be coupled with the input shaft of the toothed wheel or forward gear mechanism in a statically determined manner. By coupling the motor to the two-gear toothed gear mechanism, the torque required for the breakaway effect can be easily attained without significantly increasing the required assembly space for the chain drive by switching the toothed wheel or forward gear mechanism into the starting gear position.

BRIEF DESCRIPTION OF DRAWINGS

Further advantages and embodiments of the invention are set out in the following description of an example of embodiment set out schematically in the drawings. In the drawings.

DETAILED DESCRIPTION

Figure 1:
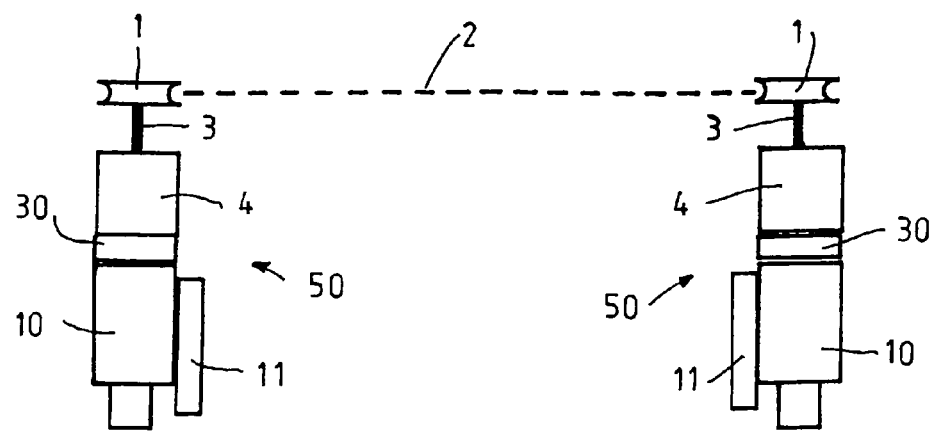
FIG. 1 shows a simplified, schematic view of an underground extraction device with two chain drives with frequency converter motors

FIG. 1 shows two chain drives, designated 50, for driving an endless chain 2 running around both sprockets 1 of the chain drives 50. In the case of a face or drift conveyor designed as a chain scraper conveyer, the chain 2 is a scraper chain band and in the case of a plough system, the chain is a plough chain which moves the coal plough, which is not shown, along the working face. The chain sprockets 1 turn the chain 2 around and are each driven with drive units with which they connected via the chain wheel shaft 3 in a torsion-stable manner. The drive units of both chain drives 50 comprise an electric rotary current asynchronous motor, designed as a frequency converter motor 10 with an integrated control box 11 for controlling the frequency converter and connected to an overload protection and load equalisation gear mechanism 4 with an intermediately arranged forward gear mechanism 30. The overload protection and load equalisation gear mechanism 4 is, more particularly, designed as a planetary gear mechanism with two planet positions, whereby a hydraulically operated disk coupling is assigned to the hollow wheel of one of the planet gears in order to achieve load-free starting of all motors 10, to be able to effect load equalisation between the two drive units 50, and, in the case of blockages of the chain 2 to release the drive connection between the motors 10 and the chain sprockets 1. The assembly and corresponding functioning of the overload and load equalisation gear mechanism is known, for example, from DE 43 16 798 A1.

Figure 2:
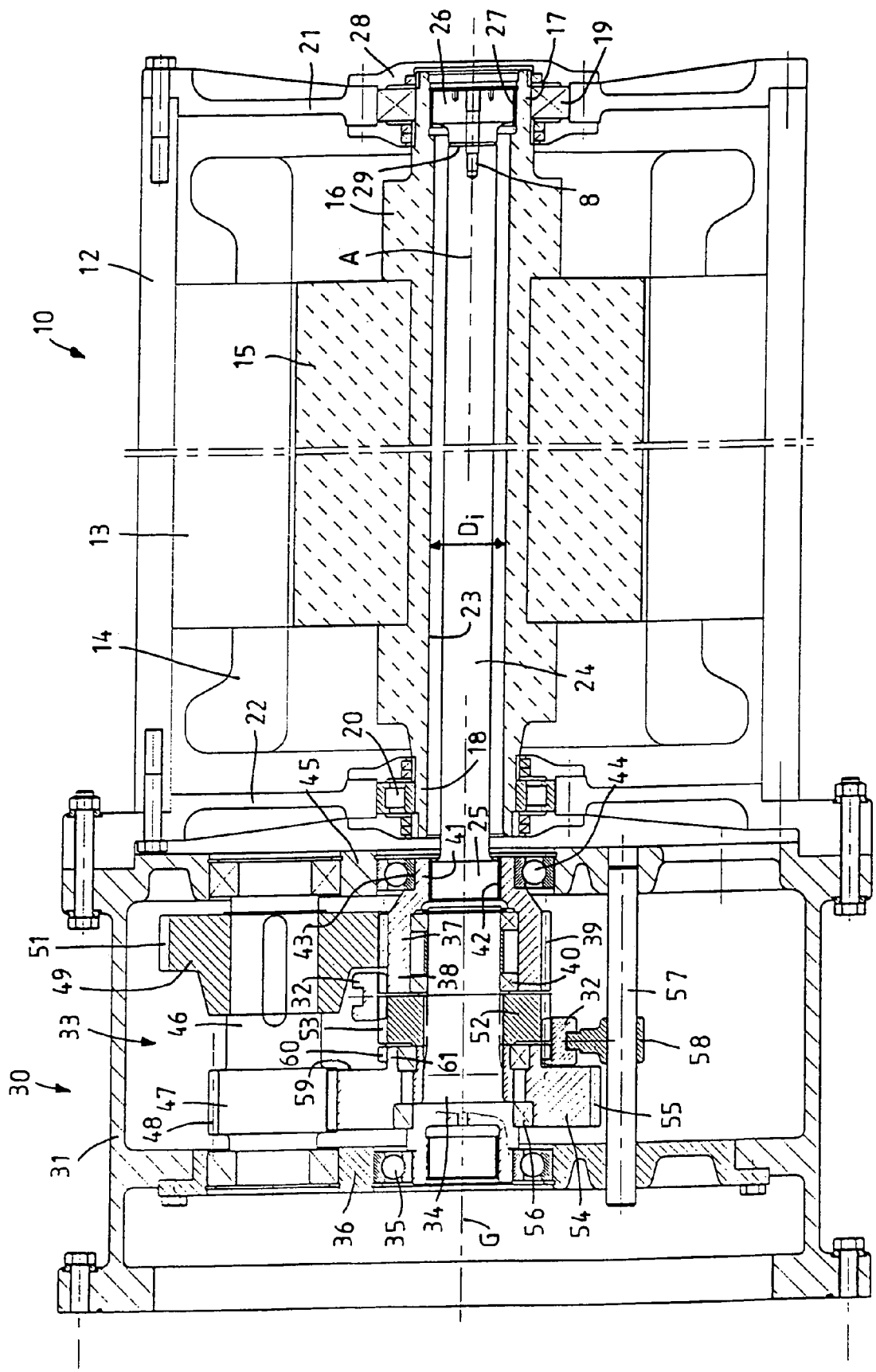
FIG. 2 shows a cross-section of a frequency converter motor coupled to a forward gear mechanism.

FIG. 2 shows a longitudinal section through the frequency converter motor 10 and the forward gear mechanism 30. The frequency converter motor 10 has a motor casing 12 with an integrated control box (11, FIG. 1) for controlling the frequency converter. Inside the motor casing 12 is a stator 13 with stator windings 14, whereby arranged at a distance of an air gap inside the stator 13 is the rotor 15 of the frequency converter motor 10 with which motor shaft designed as a hollow shaft 16 is connected in a torsion-stable manner. The fundamental assembly of a rotary current asynchronous motor designed as a frequency converter motor is known to a person skilled in the art, so that a more detailed description of the electrical method of operation of the frequency converter motor 10 is not given here. The hollow shaft 16 is borne both at the rear end 17 and the motor flange end 18 via bearings 19, 20 in a rotating manner on the rear bearing plate 21 and the motor flange plate 22 respectively and is provided with an axial boring 23, in which a torsion rod 24 is arranged, which passes completely through the axial boring 23 and projects at the motor flange side end 18 of the hollow shaft 16 with a drive pinion 25 from the axial boring 23 and the motor casing 12. On the rear end of the torsion rod 24 there is a further pinion 26 which is provided with appropriate toothing and engages in a torsion-stable manner in counter-toothing 27 on the internal circumference of the rear end 17 of the hollow shaft. Between the counter toothing 27 and the pinion 26 of the torsion rod 24 there can be transitional play in order to facilitate the assembly of the torsion rod 24 through an opening which can be closed with a closing lid 28 in the rear bearing plate 21 of the motor casing 23. The external diameter of the pinion 25 is preferably slightly smaller and the outer diameter of the pinion 26 is preferably slightly larger than the internal diameter $D_i$ of the axial boring 23. In the area of the pinion 26 a nominal breakage point 29 is formed on the torsion rod 24 by way of a shearing groove, whereby a threaded boring 8 arranged on axis A of the torsion rod 24 extends beyond the nominal breakage point 29 in the direction of the gear side pinion 25 of the torsion rod 24 so that even in the event of breakage of the torsion rod 24 in the area of the nominal breakage point 29 a dismantling tool (not illustrated) can be screwed into the threaded boring 8 and the torsion rod 24 pulled out of the axial boring 23. As the torsion rod 24 is only coupled to the hollow shaft 16 at its rear end 17 and supported relative to the hollow shaft 16, alignment errors between the casing 12 of the frequency converter motor 10 and, respectively, axis A of the hollow shaft 16 and the casing 31 of the forward gear mechanism 30 can be compensated for. There is therefore no necessity to arrange a coupling, such as a torsion elastic claw coupling, between the frequency converter motor 10 and the forward gear mechanism 30.

In the shown example of embodiment the forward gear mechanism 30 is designed as a two-gear toothed wheel gear mechanism whereby switching between a starting gear position and a normal gear position is carried out by way of a control ring or a control hub 32. In the lateral view in FIG. 2 the control hub 32 is shown in the lower half in the starting gear position and in the upper half in the normal gear position as will be explained.

The two-gear toothed wheel gear mechanism 33 of the forward gear mechanism 30 designed as a returning transmission gear mechanism has a gear shaft 34 which on the output side is borne in the output side bearing plate 36 by means of bearing 35. The gear shaft 34 extends on the frequency converter motor 10 to close to the pinion 25 of the torsion rod 24 with a gap remaining between the pinion 25 and the gear shaft 34. On the motor side end of the gear shaft 34 a drive-side central wheel 37 of the toothed wheel gear mechanism 33 is borne, which in this case is designed as a bushing, and the section of the central wheel 37 provided with gear toothing 39 is borne in a rotating manner on the free end of the gear shaft 34 by way of bearing 40. The central wheel 37 tapers vis-à-vis the section with the spur gear toothing 39 to a connection section 41, which has toothing 42 on its inner circumference and is, or can be, connected as a hub in a torsion-stable manner to the pinion 25 of the torsion rod 24. On its outer circumference the connection section 41 has a cylindrical band 43 which is borne by way of bearing 44 on the motor-side bearing plate 45, which is an integral part of the gear casing 31. Axially displaced vis-à-vis the gear shaft 34 there is a secondary shaft 46 borne in a rotating manner on both bearing plates, whereby the secondary shaft 46 has a cam 47 with gear toothing 48 as well as a shaft section on which, for example, a single wheel 49 with gear toothing 51 is borne in a torsion-stable manner by means of a feather key connection. As further components the toothed wheel gear mechanism 33 has a control wheel 52 with spur gear toothing 53 connected in a torsion-stable manner to the gear shaft, as well as an output side central wheel 54 with spur gear toothing 55, which is supported by means of bearing 56 in a freely rotating manner on the gear shaft 34.

In the normal gear position in which the control hub 32, which is movable over the control shaft 57 and the control fork 58 firmly connected thereto, connects a section of the gear toothing 53 of the control wheel 52 with a section of the gear toothing 39 of the drive side central wheel 57, the control wheel 52 and therefore the gear shaft 34 rotates at the same speed as the torsion rod 24 connected to the central wheel 37. This position of the control hub 32 therefore corresponds to the normal gear position of the gear box 33 with a gear transmission of 1:1.

The toothed wheel transmission gearing brought about by the engaging spur wheel and gear toothing 39, 51, 48 and 55 of the toothed wheels and pinions 37, 49, 47 and 54 respectively has a slow transmission ratio of 1:4 in the starting gear position in the shown embodiment. The starting gear position is only active if the control hub 32, as shown in the lower half of FIG. 2, is in the left position in contact with the flank 59 of the output side central wheel 54. In this position the control hub 32 simultaneously covers a section of the gear toothing 53 of the control wheel 52 and a toothed section 60 on the output side central wheel 54 which is formed on a collar 61 of the central wheel 54 projecting in the direction of the electric motor 10. The position of the control hub 32 and the coupling of the toothed sections 60 and 53 causes the speed of the central wheel 54 to be transmitted to the control wheel 52 and therefore to the gear shaft 34. In contrast to this, as has already been set out above, in the normal gear position the control hub 32 engages with the gear toothing 39 of the drive side central wheel 37 and the toothing 53 of the control wheel 52 in such a way that the gear shaft rotates at the same speed as the torsion rod 24 of the frequency converter motor 10.

Figure 3:
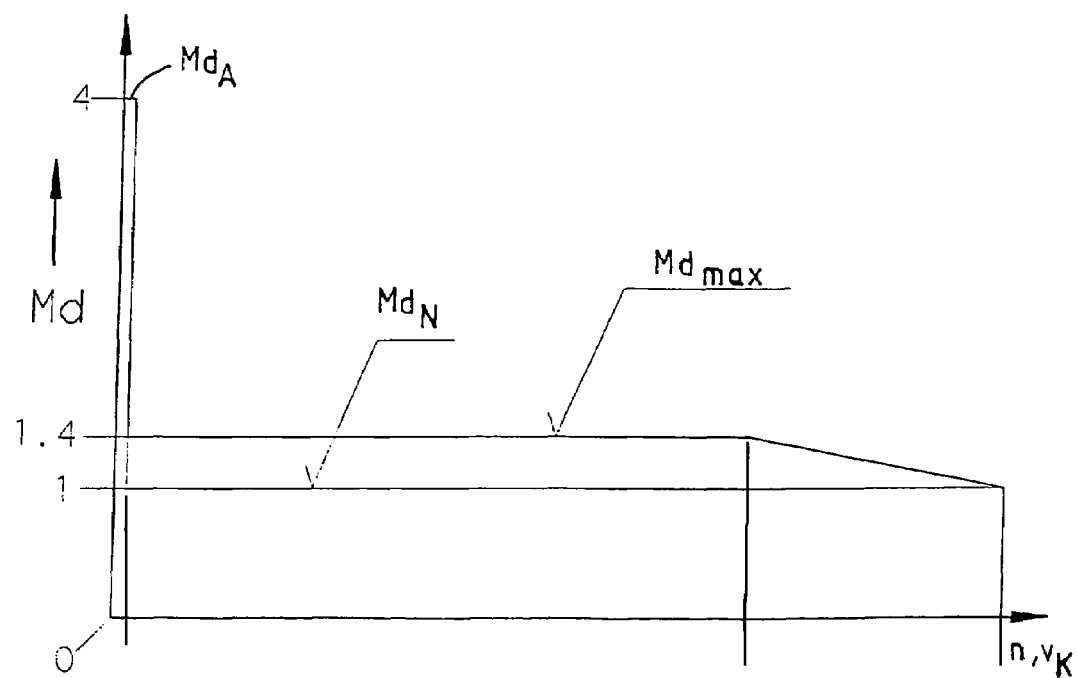
FIG. 3 shows in a diagram the motor torque attainable with the frequency converter motor and the forward gear mechanism.

The starting gear position brought about by the two-gear toothed wheel gear mechanism is only initiated if a breakaway effect is to be achieved with the frequency converter motor 10 and the chain drive 50 in order to start the loaded chain scraper conveyor or to release the plough. As shown schematically in the diagram in FIG. 3, in the starting gear position the motor torque $M_d$ brought about on the output side by the combination of frequency converter motor 10 and toothed wheel gear mechanism 33 and/or forward gear mechanism 20 increases to the breakaway torque $Md_A$ which in this case is around four times the nominal motor torque $Md_N$. The starting gear position can only initiated at low revolutions or low chain speeds $V_k$.

This invention is not limited to the illustrated example of embodiment. The use of a frequency converter motor with a hollow shaft and torsion rod forms the preferred embodiment of the invention. The toothed wheel transmission gear mechanism and the frequency converter motor can also be arranged in a common casing, whereby the drive-side central wheel then coincides with the motor shaft so that one of the two bearings 20, 44 can be dispensed with. In this embodiment it is obviously also unnecessary to form the motor shaft as a hollow shaft with a torsion rod.

The invention claimed is:

1. Drive system for chain sprockets of chain drives, preferably for driving chain scraper conveyors or chain-drawn ploughs for underground mining, the system comprising a drive assembly having an asynchronous motor and a gear mechanism, the gear mechanism being an overload gearing having a controllable multiple-disk clutch for overload equalisation with which the force flow between the asynchronous motor and the chain sprocket can be disconnected, wherein the asynchronous motor comprises a frequency converter motor with a motor shaft, and the drive assembly has a two-gear toothed wheel gear mechanism arranged between the motor shaft and the gear mechanism, the two-gear toothed wheel gear mechanism having a starting gear position and a normal gear position.

2. Drive system according to claim 1, wherein the two-gear toothed wheel gear mechanism is designed as a forward gearing mechanism.

3. Drive system according to claim 1, wherein the two-gear toothed wheel gear mechanism has a returning transmission gear mechanism with a gear transmission of preferably 1:3 to 1:4 for the starting gear position.

4. Drive system according to claim 1, wherein the toothed wheel gear mechanism has gear shaft, a drive side central wheel borne in a rotating manner on the gear shaft and an output side central wheel borne in a rotating manner on the gear shaft, and between said central wheels there is arranged a control wheel connected in a torsion-stable manner to the gear shaft, whereby the control wheel can be coupled in a rotating manner by means of a control device to either the drive side or output side central wheel.

5. Drive system according to claim 4, wherein both central wheels and the control wheel have a toothed section with identical toothing aligned with and adjacent to each other.

6. Drive system according to claim 4, wherein the control device comprises a control hub which is pushable over the toothed sections of two adjacent toothed wheels of the toothed wheel gear mechanism.

7. Drive system according to claim 6, wherein the control hub is movable by means of a control fork which can be moved parallel to the gear shaft axis by means of a control rod.

8. Drive system according to claim 4, wherein the toothed wheel gear mechanism has a casing and wherein the gear shaft is borne on the output side on the gear casing and is supported on the drive side by the drive side toothed wheel which on the drive side is borne in a rotating manner on the gear casing.

9. Drive system according to claim 1, wherein the toothed wheel gear mechanism has a gear casing and a secondary shaft borne in a rotating manner on the gear casing, the secondary shaft having a first gear toothing engaging with the drive side central wheel, and a second gear toothing engaging in the output side central wheel.

10. Drive system according to claim 9, wherein at least the first gear toothing is part of a single wheel connected in a torsion-stable manner to the secondary shaft.

11. Drive system according to claim 2, wherein the toothed wheel gear mechanism comprises a spur gearing.

12. Drive system according to claim 4, wherein the drive side central wheel is designed as a bushing and/or is internally provided with a hub connection for the motor shaft.

13. Drive system according to claim 2, wherein the frequency converter motor and the toothed wheel gear mechanism are arranged in a common casing whereby the drive side central wheel is preferably arranged on the motor shaft.

14. Drive system according to claim 1, wherein the frequency converter motor is provided with a motor casing, a stator with stator windings, a rotor with frequency converter control and a motor shaft rotating with the rotor, the shaft having a motor flange side adjacent the gear mechanism and a rear side at the opposite end, both the motor flange side and the rear of the motor shaft being borne on the motor casing, the motor shaft being designed as a hollow shaft, the axial boring of which is penetrated by a torsion rod , which is moveably coupled therewith only at the rear end of the hollow shaft.

15. Drive system according to claim 14, wherein the torsion rod passes through the axial boring and/or the motor casing in a contact-free manner on the motor flange side.

16. Drive system according to claim 14, wherein the torsion rod can be inserted and pushed through the hollow tube from its rear end.

17. Drive system according to claim 14, wherein the motor flange side end of the torsion rod has a pinion, toothing or a shaft connection, the outer diameter of which is smaller than the minimum internal diameter of the axial boring.

18. Drive system according to claim 17, wherein the rear end of the torsion rod has a pinion, hub connection means or hub connection toothing, the external diameter of which is greater than the motor flange side end of the torsion rod and the inner diameter of the axial boring.

19. Drive system according to claim 14, wherein at the rear end of the torsion rod there is a nominal breakage point and in that fastening means for an assembly/dismantling aid for the torsion rod are arranged between the nominal breakage point and the motor flange end.

20. Drive system according to claim 19, wherein the fastening means has an axial threaded boring in a face side of the torsion rod.

21. Drive system according to claim 14, wherein the frequency converter control is arranged in a control box integrated into the motor casing.

22. Drive system according to claim 14, wherein the motor flange side end of the torsion rod projects from the motor casing.

* * * * *